United States Patent
Kuris et al.

(10) Patent No.: US 11,334,823 B2
(45) Date of Patent: May 17, 2022

(54) METHODS AND SYSTEMS FOR INTEGRATING BUSINESS INTELLIGENCE DATA INTO CONTINUOUS INTEGRATION ENVIRONMENTS

(71) Applicant: Red Hat Israel, Ltd., Ra'anana (IL)

(72) Inventors: Eran Kuris, Holon (IL); Alexander Stafeyev, Bet shemes (IL); Arie Bregman, Gan Yavne (IL)

(73) Assignee: Red Hat Israel, Ltd., Ra'anana (IL)

( * ) Notice: Subject to any disclaimer, the term of this patent is extended or adjusted under 35 U.S.C. 154(b) by 28 days.

(21) Appl. No.: 16/290,270

(22) Filed: Mar. 1, 2019

(65) Prior Publication Data

US 2020/0279201 A1     Sep. 3, 2020

(51) Int. Cl.
| | | |
|---|---|---|
| G06Q 10/06 | (2012.01) | |
| G06N 5/02 | (2006.01) | |
| G06Q 30/00 | (2012.01) | |
| G06F 16/25 | (2019.01) | |
| G06N 5/04 | (2006.01) | |
| G06F 8/60 | (2018.01) | |

(52) U.S. Cl.
CPC ......... *G06Q 10/06312* (2013.01); *G06F 8/60* (2013.01); *G06F 16/258* (2019.01); *G06N 5/022* (2013.01); *G06N 5/04* (2013.01); *G06Q 10/06315* (2013.01); *G06Q 30/01* (2013.01)

(58) Field of Classification Search
None
See application file for complete search history.

(56) References Cited

U.S. PATENT DOCUMENTS

| | | | |
|---|---|---|---|
| 9,785,907 B2 | 10/2017 | Hankins et al. | |
| 10,027,540 B2 | 7/2018 | Deklich et al. | |
| 2013/0124600 A1* | 5/2013 | Jaroker | G06Q 30/0621 709/202 |
| 2016/0308733 A1* | 10/2016 | Chauhan | G06F 8/61 |

(Continued)

FOREIGN PATENT DOCUMENTS

| | | |
|---|---|---|
| CN | 106845947 | 6/2017 |
| CN | 107203462 | 9/2017 |

OTHER PUBLICATIONS

Tang et al. (Y. Tang and N. W. Bergmann, "A Hardware Scheduler Based on Task Queues for FPGA-Based Embedded Real-Time Systems," in IEEE Transactions on Computers, vol. 64, No. 5, pp. 1254-1267, May 1, 2015, doi: 10.1109/TC.2014.2315637.).*

(Continued)

*Primary Examiner* — Matthew D Henry
(74) *Attorney, Agent, or Firm* — K&L Gates LLP (57) ABSTRACT

A method and system for integrating business intelligence data into a continuous integration system are provided. In one embodiment, a method is provided comprising receiving business intelligence data regarding utilized product features and job data regarding tested product features. The method may further include converting the business intelligence data and the job data into unified business intelligence data and unified job data in a unified format. The method may also include generating a feature map based on the unified business intelligence data and unified job data, determining an insufficient mapping based on the feature map, and identifying a job flag based on the insufficient mapping.

18 Claims, 7 Drawing Sheets

(56) References Cited

U.S. PATENT DOCUMENTS

2017/0185509 A1* 6/2017 Arkadyev ............ G06F 11/3696
2018/0082233 A1* 3/2018 Apshankar ............ G06F 11/302

OTHER PUBLICATIONS

Manjula Rathnayaka, "Continuous Integration and Deployment for API Management", https://dzone.com/articles/continuous-integration-and-deployment-for-api-mana-1, published Apr. 2, 2018, retrieved Dec. 31, 2018; (4 pages).

Puonti, et al., "A Continuous Delivery Framework for Business Intelligence", https://www.researchgate.net/publication/323676722_A_Continuous_Delivery_Framework_for_Business_Intelligence, published Feb. 2018, retrieved Dec. 31, 2018; (16 pages).

Dillon Erb, "CI/CD for Machine Learning & AI", https://blog.paperspace.com/ci-cd-for-machine-learning-ai/, published Oct. 22, 2018, retrieved Dec. 31, 2018; (14 pages).

* cited by examiner

METHODS AND SYSTEMS FOR INTEGRATING BUSINESS INTELLIGENCE DATA INTO CONTINUOUS INTEGRATION ENVIRONMENTS

BACKGROUND

Continuous integration development systems are designed to regularly integrate and deploy programs for users. Such continuous integration systems reduce the time required to develop and deploy new features and increase access to newly-developed features for users. In order to continuously deploy newly-developed features or updates, code written by developers is regularly tested before deployment. These developers also design and create tests for program features to run before deployment.

SUMMARY

The present disclosure presents new and innovative methods and system for integrating business intelligence data into continuous integration environments. In one embodiment, a method is provided comprising receiving business intelligence data comprising data regarding a plurality of utilized product features, receiving job data comprising one or more jobs, wherein each job relates to at least one of a plurality of tested product features, converting the business intelligence data into unified business intelligence data in a unified format, and converting the job data into unified job data in the unified format. The method may further comprise generating a feature map between the utilized product features and the tested product features based on the unified business intelligence data and the unified job data, determining an insufficient mapping of the feature map between a tested product feature and at least one of the plurality of utilized product features, and identifying at least one job flag based on the insufficient mapping.

In another embodiment, the at least one job flag comprises an unnecessary job related to a tested product feature with no corresponding utilized product feature in the feature map.

In yet another embodiment, the business intelligence data further comprises data regarding a plurality of developed product features and the at least one job flag comprises a stale job related to a tested product feature with no corresponding developed product feature in the feature map.

In a further embodiment, the at least one job flag comprises a wasteful job containing configured to execute at a frequency that exceeds a threshold set based on the number of utilized product features in the feature map corresponding to the tested product feature.

In a still further embodiment, the at least one job flag comprises a missing job corresponding to a utilized product feature with no corresponding tested product feature in the feature map.

In another embodiment, the method further comprises removing the at least one job flag from a continuous integration environment corresponding to the job data.

In yet another embodiment, the method further comprises generating a job recommendation based on the at least one job flag.

In a further embodiment, the job recommendation includes one or more recommendations selected from the group consisting of: (i) removing a flagged job associated with at least one job flag, (ii) adjusting an execution frequency of the flagged job, and (iii) creating a new job to test a utilized product feature.

In a still further embodiment, converting the job definition data into the unified job definition data comprises analyzing one or both of (i) a job name of a job and (ii) a job parameter of a job to identify a tested product feature.

In another embodiment, the business intelligence data comprises one or more of the data types consisting of: customer support data, customer relationship management (CRM) data, code submission data, and customer sales orders.

In yet another embodiment, the business intelligence data comprises a plurality of data types, and converting the business intelligence data into the unified business intelligence data comprises converting data of each of the plurality of data types into converted data in the unified format, and removing duplicate entries within the converted data.

In a further embodiment, the business intelligence data represents one or both of developer behavior regarding the product feature and customer behavior regarding the product feature.

In a still further embodiment, a system is provided comprising a processor and a memory. The memory may contain instructions which, when executed by the processor, cause the processor to receive business intelligence data comprising data regarding a plurality of utilized product features, receive job data comprising one or more jobs, wherein each job relates to at least one of a plurality of tested product features, convert the business intelligence data into unified business intelligence data in a unified format, and convert the job data into unified job data in the unified format. The memory may contain further instructions which, when executed by the processor, cause the processor to generate a feature map between the utilized product features and the tested product features based on the unified business intelligence data and the unified job data, determine an insufficient mapping of the feature map between a tested product feature and at least one of the plurality of utilized product features, and identify at least one job flag based on the insufficient mapping.

In another embodiment, the at least one job flag comprises an unnecessary job related to a tested product feature with no corresponding utilized product feature in the feature map.

In yet another embodiment, the business intelligence data further comprises data regarding a plurality of developed product features and the at least one job flag comprises a stale job related to a tested product feature with no corresponding developed product feature in the feature map.

In a further embodiment, the at least one job flag comprises a wasteful job configured to execute at a frequency that exceeds a threshold set based on the number of utilized product features in the feature map corresponding to the tested product feature.

In a still further embodiment, the at least one job flag comprises a missing job corresponding to a utilized product feature with no corresponding tested product feature in the feature map.

In another embodiment, the memory contains further instructions which, when executed by the processor, cause the processor to remove the at least one job flag from a continuous integration environment corresponding to the job data.

In yet another embodiment, the memory contains further instructions which, when executed by the processor, cause the processor to generate a job recommendation based on the at least one job flag.

In a further embodiment, a non-transitory, computer-readable medium is provided storing instructions which, when executed by a processor, cause the processor to receive business intelligence data comprising data regarding a plurality of utilized product features, receive job data comprising one or more jobs, wherein each job relates to at least one of a plurality of tested product features, convert the business intelligence data into unified business intelligence data in a unified format, and convert the job data into unified job data in the unified format. The non-transitory, computer-readable medium may store further instructions which, when executed by the processor, cause the processor to generate a feature map between the utilized product features and the tested product features based on the unified business intelligence data and the unified job data, determine an insufficient mapping of the feature map between a tested product feature and at least one of the plurality of utilized product features, and identify at least one job flag based on the insufficient mapping.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Because developers are typically responsible for creating and adding jobs for testing program features to the continuous integration environment, it is typically easy for such developers to add jobs to the continuous integration environment. However, after the development efforts have ceased for certain features, the jobs associated with testing those features may remain in the continuous integration environment for several reasons. For example, a developer that has created and added a job to a continuous integration environment may forget to remove the job once development efforts for that feature have completed. Over time, the number of forgotten or otherwise unused jobs in a continuous integration environment may rise to a large number (e.g., hundreds or thousands of unnecessary jobs) that waste system resources. Such a large number of unnecessary jobs can cause significant delays (e.g., up to several hours or more) in testing new features before deployment. Such delays may seriously delay deployment of new features and may undermine the "continuous" nature of continuous integration systems.

Additionally, sometimes developers may not recognize that certain product features are proving popular with users and may not engage in actively developing or testing such features. This lack of realization on the part of developers may lead to inefficiently-allocated development efforts or future bugs. For example, without identifying which product features are most important to customers, developing efforts may be misallocated to unimportant or unused product features. In another example, if robust testing jobs are not created for popular product features, certain implementations may go untested, leading to bugs in future releases of such product features.

One way of solving the above-identified problems is to access and analyze both business intelligence (BI) data and job data to determine which product features are currently utilized frequently by users and which product features are currently being tested regularly in the continuous integration environment. The business intelligence data may include one or more of customer relationship management (CRM) data, customer support data, code submission data, and customer sales order data. Both the business intelligence data and the job data may be converted to a unified format and used to generate a feature map. The feature map may include mappings between utilized product features identified from the business intelligence data and test product features identified from the job data. For example, the feature map may include mappings between utilized product features and corresponding tested product features. The feature map may then be analyzed in order to determine an insufficient mapping. The insufficient mapping may include, e.g., a missing utilized product feature missing from the business intelligence data suggesting a potentially unnecessary job that may be wasting continuous integration environment resources or a missing tested product feature missing from the job data suggesting a potentially untested product feature that may create risks for future developments. If an insufficient mapping is determined, a job flag may then be identified based on the insufficient mapping for future processing. This future processing may include generating a recommendation for a user or automatically removing or adjusting unnecessary or wasteful jobs. Such an implementation may help identify and remove wasteful or inefficient jobs within the continuous integration environment, thereby improving hardware utilization by reducing processor and memory use and requirements, while also improving the testing frequency of product features that are regularly utilized by users.

Figure 1:
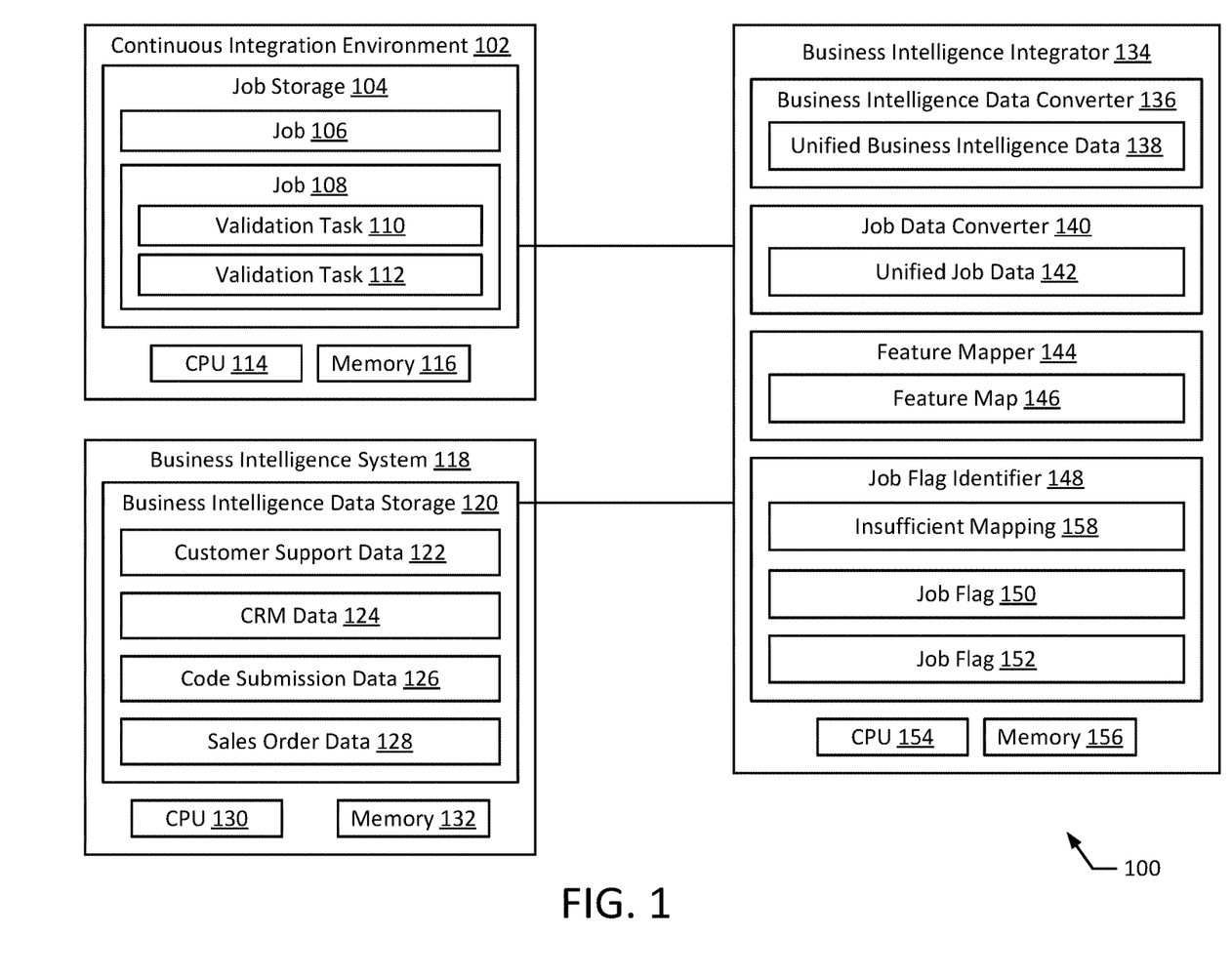
FIG. 1 illustrates a system according to an exemplary embodiment of the present disclosure.

FIG. 1 depicts a system 100 according to an exemplary embodiment of the present disclosure. The system 100 may be used to integrate business intelligence data into a continuous integration workflow to identify inefficient for missing jobs within the continuous integration system.

The system 100 includes a continuous integration environment 102, a business intelligence system 118, and a business intelligence integrator 134. The continuous integration environment 102 includes a job storage storing jobs 106, 108. The job 108 includes validation tasks 110, 112. The continuous integration environment 102 also includes a CPU 114 and a memory 116. The business intelligence system 118 includes a business intelligence data storage 120, a CPU 130, and a memory 132. The business intelligence data storage 120 stores customer support data 122, CRM data 124, code submission data 126, and sales order data 128. The business intelligence integrator 134 includes a business intelligence data converter 136 storing a unified business intelligence data 138, a job data converter 140 storing a unified job data 142, a feature mapper 144 storing a feature map 146, and a job flag identifier 148 storing an insufficient mapping 158 and job flags 150, 152. The business intelligence integrator 134 also includes a CPU 154 and a memory 156.

The continuous integration environment 102 may be configured to perform jobs 106, 108 to test product features being developed. For example, the jobs 106, 108 may be created by developers to test product features before deployment for utilization by users. To create the jobs 106, 108, the developers may create one or more validation tasks 110, 112 to verify one or more aspects of the tested product features before deployment. The tested product features may include new product features, old product features, and/or updated versions of previous product features. The jobs may test the product features in certain implementation environments, certain operational environments, and/or interactions with other product features.

The job storage 104 stores the jobs 106, 108 for use by the continuous integration environment 102 in testing the tested product features. The continuous integration environment 102 may be configured to execute the jobs 106, 108 based on one or more triggering actions. For example, the triggering actions may include an action-based trigger triggered by one or more developer actions (e.g., the developer checking in a code base). In another example, the triggering actions may include a time-based trigger activated at a regular time frequency (e.g., every day, every week, or every month). In a further example, the triggering actions may include a manual trigger (e.g., a user request to perform a job 106, 108).

The validation tasks 110, 112 may include, e.g., copying a code base, compiling a code base, performing one or more unit tests with the compiled code base. The validation tasks 110, 112 and/or the jobs 106, 108 may correspond to one or more product features (i.e., tested product features). For example, the job 106 may correspond to a single tested product feature. In another example, the job 108 may correspond to more than one tested product feature (e.g., validation task 110 may correspond to a first tested product feature and validation task 112 may correspond to a second tested product feature).

During execution in the continuous integration environment 102, the jobs 106, 108 may consume resources and may execute in a queue according to a priority and/or a triggering time of the job 106, 108. During development, code bases associated with pending jobs 106, 108 may be prevented from deployment for utilization by a user until all associated jobs 106, 108 have been completed successfully within the continuous integration environment 102. Therefore, unnecessary and numerous jobs 106, 108 in the execution queue may prevent code bases from being tested in a timely manner for quick deployment, as discussed above.

The business intelligence system 118 may be configured to store one or more types of business intelligence data. The business intelligence data storage 120 may be configured to store business intelligence data of multiple types, including customer support data 122, CRM data 124, code submission data 126, and sales order data 128 (collectively, business intelligence data 122, 124, 126, 128). The customer support data 122 may include customer support tickets, customer support incidents, or other customer support reports (e.g., SOS reports from customers). The sales order data 128 may include information such as the name and quantity of software products, including one or more specific product features purchased or accessed by users and customers. The CRM data 124 may include one or more pieces of customer information, including products or features accessed, purchased, or utilized by users and/or customers. The CRM data 124 may also include user customer interaction and communication records. In certain implementations, the CRM data 124 may include the customer support data 122 and the sales order data 128. The code submission data 126 may include data regarding development efforts for software products and product features. For example, the code submission data 126 may include data regarding code commits for code bases, features and functions associated with code commits, and a number or indication of developers accessing and committing code bases associated with certain product features. In certain implementations, one or more of the customer support data 122, the CRM data 124, the code submission data 126, and the sales order data 128 may be stored in separate systems based on data type. For example, the CRM data 124 may be stored in a CRM system, such as a CRM system provided by Salesforce®. Similarly, the code submission data 126 may be stored in a code management system, such as a code management system provided by GitHub®. In such implementations, the business intelligence data 122, 124, 126, 128 may be accessed, e.g., via an application programming interface (API) of the associated system.

In certain implementations, data of the same type may also be stored in multiple databases (e.g., SQL databases). For example, data of the same type may be stored on separate databases organized by the product features or software product associated with the business intelligence data 122, 124, 126, 128.

The business intelligence integrator 134 may be configured to combine job data regarding the jobs 106, 108 stored within the job storage with business intelligence data 122, 124, 126, 128 stored within the business intelligence data storage 120. The business intelligence integrator 134 may then analyze the job data and business intelligence data 122, 124, 126, 128 to identify job flags associated with stale jobs, wasteful jobs, unnecessary jobs, or missing jobs.

The business intelligence data converter 136 may convert business intelligence data 122, 124, 126, 128 into unified business intelligence data 138 in a unified format. To do so, the business intelligence data converter 136 may identify one or more utilized or developed product features associated with the business intelligence data 122, 124, 126, 128. For example, the business intelligence data converter 136 may analyze customer support orders stored within the customer support data 122 to identify utilized product features as the product features with a number of associated customer support orders that exceed a certain threshold. As another example, the business intelligence data converter 136 may analyze sales order data 128 to identify utilized product features as the product features with a number of associated sales orders that exceed a certain threshold. As a further example, the business intelligence data converter 136 may analyze code submission data 126 to identify developed product features as the product features with code commits or associated developers above a certain threshold. In generating the unified business intelligence data 138, the business intelligence data converter 136 may utilize one or more heuristics or machine learning algorithms, as detailed further below.

The job data converter 140 may be configured to convert job data concerning jobs 106, 108 from the job storage 104 into unified job data 142. The unified job data 142 may identify one or more tested product features associated with the jobs 106, 108. The job data converter 140 may use one or more heuristics or machine learning algorithms in generating the unified job data 142. For example, the heuristics of machine learning algorithms may analyze one or more of the job name, job parameters, and validation tasks 110, 112 of the jobs 106, 108 in generating the unified job data 142.

In certain implementations, the unified job data 142 may be in the same unified format as the unified business intelligence data 138.

The feature mapper 144 may be configured to map between utilized and developed product features identified in the unified business intelligence data 138 and tested product features identified in the unified job data 142 in order to generate a feature map 146. In generating the feature map, the feature mapper 144 may identify corresponding features between the utilized and developed product features and the tested product features. For example, the feature mapper 144 may identify a product feature of a software product common between a developed or utilized product feature and a tested product feature and may generate a mapping between the two features indicating that they correspond to the same product feature.

The job identifier 148 may be configured to determine insufficient mapping 158 based on the feature map 146 and may generate one or more job flags 150, 152 based on the insufficient mapping. For example, the job flag identifier 148 may identify an insufficient mapping 158 of the feature map 146 as a missing mapping between a developed or utilized product feature and a tested product feature. For example, the job flag identifier 148 may analyze each developed product feature and/or each utilized product feature of the feature map 146 to identify the developed or utilized product features that lack a corresponding tested product feature. Similarly, the job flag identifier 148 may analyze each tested product feature to identify the tested product features that lack a corresponding developed or utilized product feature. In such cases where a tested product feature lacks a developer utilized product feature, or vice versa, the job flag identifier 148 may identify an insufficient mapping 158.

After identifying the insufficient mapping 158, the job flag identify 148 may identify one or more job flags 150, 152 associated with the insufficient mapping 158. For example, the job flag 150, 152 identified may depend on the type of insufficient mapping 158. The job flag identifier 148 may identify a job flag 150, 152 associated with an unnecessary job for jobs testing a tested product feature with no corresponding utilized product feature. The job flag identifier 140 may also identify a job flag associated with the stale job for jobs 106, 108 testing a tested product feature with no corresponding developed product feature, or may identify a job flag 150, 152 associated with a wasteful job for jobs 106, 108 testing a tested product feature with an execution frequency greater than a predefined threshold, as explained further below. As a further example, the job flag identifier 148 may also identify a job flag 150, 152 associated with the missing job for utilized or developed product features with no corresponding tested product feature. In implementations where more than one insufficient mapping 158 is identified in the feature map 146, the job flag identifier 148 may not identify a job flag 150, 152 for each insufficient mapping 158 identified within the feature map 146. For example, the job flag identifier 148 may identify job flag 150, 152 for the insufficient mappings 158 corresponding to tested, developed, or utilized product features with a certain priority, which may be determined based on business intelligence data 122, 124, 126, 128 or execution frequency. For example, more popular product features utilized by users may receive a higher priority. As another example, jobs 106, 108 with a higher execution frequency may be granted a higher priority. As will be explained further below, the job flag 150, 152 identified by the job flag identifier 148 may be subsequently used to generate a recommendation for a user, to remove jobs 106, 108 from the job storage 104, or to adjust associated jobs 106, 108 (e.g., adjusting the execution frequency).

One or more of the components of the system 100 may be connected over a network such as the Internet or a local area network. For example, as depicted, the continuous integration environment 102 may be connected to the business intelligence integrator 134 over a network, and the business intelligence system 118 and the business intelligence integrator 134 may be connected over a network. In certain implementations, the continuous integration environment 102 and the business intelligence system 118 may be connected to the business intelligence integrator 134 via the same network. The connections may be implemented by one or more physical or wireless interfaces, e.g., Ethernet, Wi-Fi, cellular data, and Bluetooth connections.

One or more of the continuous integration environment 102, the business intelligence integrator 134, and the business intelligence system 118 may be implemented by a computer system. In particular, the CPU 114 and the memory 116 may implement one or more features of the continuous integration environment 102, the CPU 130 and the memory 132 may implement one or more features of the business intelligence system 118, and the CPU 154 and memory 156 may implement one or more features of the business intelligence integrator 134. For example, the memories 116, 132, 156 may store instructions which, when executed by the CPUs 114, 130, 154, cause the CPUs 114, 130, 154 to perform one or more features of the continuous integration environment 102, the business intelligence system 118, or the business intelligence integrator 134.

In addition, each of the continuous integration environment 102, the business intelligence system 118, and the business intelligence integrator 134 may be implemented by one or more computer systems. For example, the business intelligence system 118 may comprise a plurality of separate computer systems responsible for creating and storing business intelligence data 122, 124, 126, 128 of different types, as explained above. Similarly, the continuous integration environment 102 may comprise a plurality of computing systems responsible for implementing, e.g., the job storage 104. In such implementations, the CPUs 114, 130, 154 and the memories 116, 132, 156 may also be implemented by a plurality of CPUs and memories.

Figure 2:
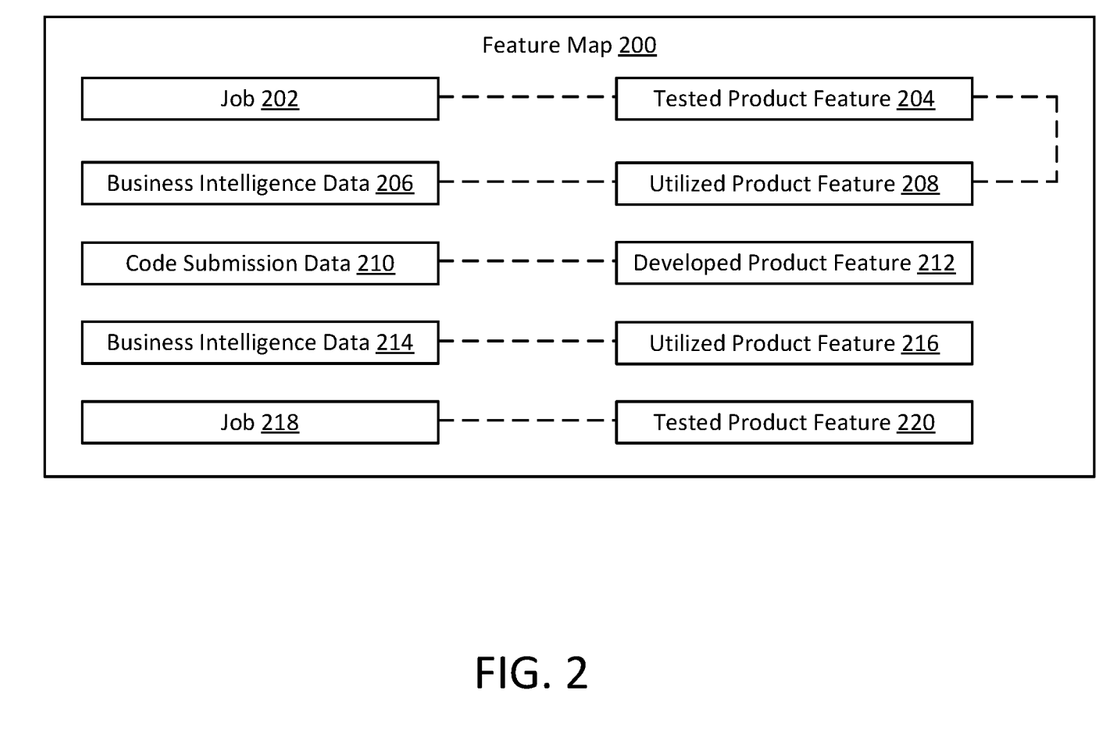
FIG. 2 illustrates a feature map according to an exemplary embodiment of the present disclosure.

FIG. 2 depicts a feature map 200 according to an exemplary embodiment of the present disclosure. The feature map 200 may be an example of the feature map 146 generated by the feature mapper 144. The feature map 200 may be generated based off of job data stored in the job storage 104 and business intelligence data 122, 124, 126, 128 stored in the business intelligence data storage 120. The feature map 200 includes a plurality of jobs 202, 218 associated with tested product features 204, 220. The feature map 200 also includes business intelligence data 206, 214 associated with utilized product features 208, 216. As an example, the business intelligence data 206, 214 may include one or more of customer support data 122, CRM data 124, and sales order data 120. The feature map 200 further includes code submission data (e.g., code submission data 126) associated with a developed product feature 212.

The feature map 200 further depicts a mapping between the tested product feature 204 and the utilized product feature 208. The mapping may indicate that the tested product feature 204 and the utilized product feature 208 concern the same product feature of a software product. For example, both the tested product feature 204 and the utilized product feature 208 may concern a networking feature of the software product (e.g., a count of the nodes in which a software program can be implemented, an IP address protocol used by the software product).

However, the developed product feature 212, the utilized product feature 216, and the tested product feature 220 as depicted do not have an associated product feature and may therefore lack a mapping. When analyzing the feature map 200, the job flag identifier 148 may therefore determine an insufficient mapping 158 for these features 212, 216, 220. For example, because the developed product feature 212 lacks a corresponding tested product feature, the job flag identifier 148 may determine an insufficient mapping 158 for the developed product feature 212 and may identify a job flag 150, 152 for the insufficient mapping 158 indicative of a missing job that should be included within the continuous integration environment 102. Similarly, because the utilized product feature 216 lacks an associated tested product feature, the job flag identifier 148 may determine insufficient mapping 158 for the utilized product feature 216 and may identify a job flag 150, 152 for the insufficient mapping 158 indicative of missing job that should be included within the continuous integration environment 102. As another example, because the tested product feature 220 lacks a corresponding developed or utilized product feature, the job flag identifier 148 may identify insufficient mapping 158 for the tested product feature 220 and may identify a job flag 150, 152 for the insufficient mapping 158 indicative of an unnecessary or stale job that should be altered or removed from the continuous integration environment 102. In certain instances, the job flag identifier 148 may also identify a job flag 150, 152 associated with the tested product feature 204 and the utilized product feature 208, even though a mapping exists between the features. For example, if an execution frequency of the job 202 exceeds a certain threshold (e.g., a threshold based on the importance of the tested product feature 204), the job flag identifier 140 may identify a job flag 150, 152 indicative of a wasteful job that executes too frequently within the continuous integration environment 102, and may recommend that the execution frequency needs to be adjusted.

Figure 3:
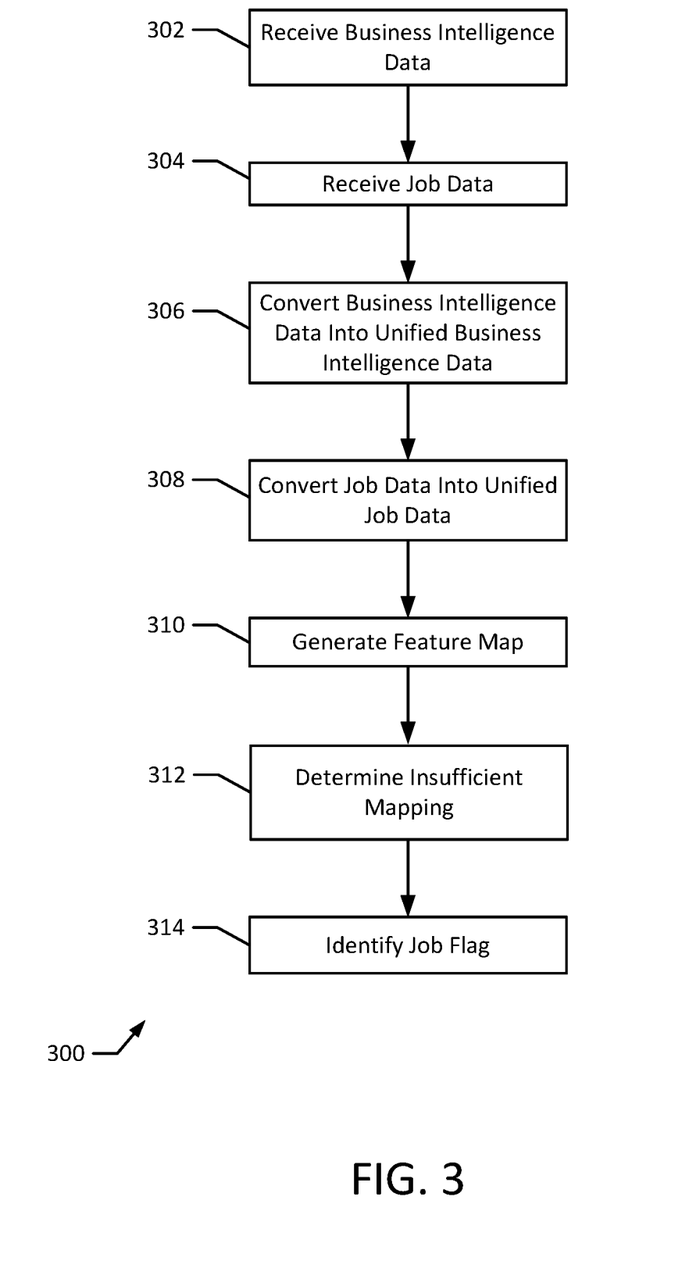
FIG. 3 illustrates a method according to an exemplary embodiment of the present disclosure.

FIG. 3 depicts a method 300 according to an exemplary embodiment of the present disclosure. The method 300 may be performed to access and analyze job data and business intelligence data 122, 124, 126, 128 in order to identify insufficient mappings 158 and/or job flags 150, 152 within a continuous integration environment 102. The method 300 may be performed by one or more components of the system 100. For example, one or more of the continuous integration environment 102, the business intelligence system 118, and the business intelligence integrator 134 may perform one or more aspects of the method 300.

The method 300 may be implemented on a computer system, such as the system 100. For example, method 300 may be implemented by the continuous integration environment 102, the business intelligence system 118, and/or the business intelligence integrator 134. The method 300 may also be implemented by a set of instructions stored on a computer readable medium that, when executed by a processor, cause the computer system to perform the method. For example, all or part of the method 300 may be implemented by the CPUs 114, 130, 154 and the memories 116, 132, 156. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 begins with receiving business intelligence data (block 302). For example, the business intelligence integrator 134 may receive business intelligence data including customer support data 122, CRM data 124, code submission data 126, and sales order data 128 from a business intelligence system 118. In particular, the business intelligence integrator 134 may receive the business intelligence data from a business intelligence data storage 120 of the business intelligence system 118, e.g., over a network connection to the business intelligence system 118. The business intelligence data 122, 124, 126, 128, 206, 214 may come in one or more formats including JSON and YAML formats. For example, in implementations where the customer support data 122, CRM data 124, code submission data 126, and sales order data 128 are stored in separate systems, each of the customer support data 122, the CRM data 124, the code submission data 126, and the sales order data 128 may come in different formats. As another example, business intelligence data 122, 124, 126, 128, 206, 214 regarding different program features or software products may come in different formats.

The business intelligence integrator may then receive job data (block 304). The job data may include data regarding one or more jobs 106, 108 stored on a job storage 104 of a continuous integration environment 102. The job data may be received from the job storage 104, e.g., over a network connection with the continuous integration environment 102. Similar to the business intelligence data 122, 124, 126, 128, 206, 214, the job data may arrive in one or more formats, e.g., JSON and YAML formats.

The business intelligence integrator may then convert the business intelligence data into unified business intelligence data (block 306). For example, a business intelligence data converter 136 of the business intelligence integrator 134 may convert the business intelligence data 122, 124, 126, 128, 206, 214 into unified business intelligence data 138. As mentioned above, the business intelligence data converter 136 may rely on one or more heuristics to identify utilized product features 208, 216 and/or developed product features 212 associated with the business intelligence data 122, 124, 126, 128, 206, 214 in order to convert the business intelligence data 122, 124, 126, 128, 206, 214 into the unified business intelligence data 130 a. To generate these heuristics, the business intelligence data converter 136 may receive feedback from developers regarding which aspects of the business intelligence data 122, 124, 126, 128, 206, 214 are associated with developed product features 212 or utilized product features 208, 216. For instance, the developers or users may identify which columns of the database correspond to features or parameters relevance to determining and associated developed product feature 212 or utilized product feature 208, 216. As an example, the columns may identify a corresponding software product or implementation details regarding the software products (e.g., an operating system, network nodes required, hardware architecture, processed data types, enabled or disabled product features). Additionally, the business intelligence data converter 136 may rely on one or more machine learning models. The machine learning models may be trained on business intelligence data 122, 124, 126, 128, 206, 214 relating to previously-identified developed product features 212 or utilized product features 208, 216. In certain implementations, the machine learning model may be preferentially used process free text portions of the business intelligence data 122, 124, 126, 128, 206, 214, e.g., one or more fields of a user request or customer support entry.

The business intelligence integrator may then convert to the job data into unified job data (block 308). For example, the job data converter 140 of the business intelligence integrator 134 may convert the job data into unified job data 142. As mentioned above, the job data converter 140 may use one or more heuristics to identify one or more tested product features 204, 220 associated with the jobs 106, 108, 202, 218 indicated in the job data in order to convert to the job data into unified job data 142. In generating these heuristics, the job data converter 140 may rely on user input regarding job names and/or job parameters. The job data converter 140 may receive user input identifying one or more naming conventions used to name jobs 106, 108, 202, 218 within the continuous integration environment 102. For example, in certain implementations testing networking features, job names may indicate to the version of the Internet protocol (IP) being tested. In such examples, e.g., a job name entitled "testing-ipv6-HA" may indicate that the job 106, 108, 202, 218 is testing a tested product feature 204, 220 with IP version 6. As another example, jobs 106, 108, 202, 218 may test software product's deployment across a plurality of nodes. In such examples, e.g., a job name entitled "05.job_name" may indicate that the job 106, 108, 202, 218 is testing a tested product feature 204, 220 relating to the software product's deployment across 5 nodes. In such examples, the user may provide the above naming conventions. For example, the user may provide a rule that any job 106, 108, 202, 218 containing "ipv #" is testing a tested product feature 204, 220 relating to an IP protocol, with the "#" character identifying the specific IP version being tested. As another example, the user may provide a rule such as, any job name preceded by two numerical characters (e.g., "##.job_name") is testing a tested product feature 204, 220 for distributed deployment across a plurality of nodes, with the two numerical characters identifying the number of nodes. After receiving the user input, the job data converter 140 may store the user input and/or the user-provided rules in a database for use in converting future job data into unified job data 142. In implementations with a plurality of continuous integration environments 102, or for a plurality of software products are developed, the job data converter 140 may use a separate set of rules for data from each continuous integration environment 102, or for each software product. Additionally, the job data converter 140 may include one or more machine learning models trained on previously-converted job data and previously-identified tested product features 204, 220. The machine learning models may perform best when analyzing one or both of the job name and a job data of jobs 106, 108, 202, 218 stored in the job storage 104. For example, rather than relying on user input, the machine learning model may determine based on previous provided examples that jobs 106, 108, 202, 218 named according to the convention "_.ipv #._" are testing the IP protocol, with the version identified by the "#" character. The machine learning model may determine this by identifying that this naming convention is strongly correlated with IP testing in the provided previous examples. Similarly, the machine learning model may determine that numerical characters proceeding a job name are strongly correlated with jobs 106, 108, 202, 218 testing tested product features relating to the number of nodes in a distributed deployment of the software product.

The business intelligence integrator may then generate a feature map (block 310). For example, the feature mapper 140 for the business intelligence integrator 134 may generate a feature map 146, 200. The feature map 146 may be generated based on the unified business intelligence data 138 and the unified job data 142. For example, the feature map 146, 200 may be generated based on the developed product features 212 or utilized product features 208, 216 identified in the unified business intelligence data 138 and the tested product features 204, 220 identified in the unified job data 142. As explained above, in generating the feature map 146, 200, the feature mapper 144 may analyze each tested product feature 204, 220 for a corresponding developed product feature 212 or utilized product feature 208, 216. Similarly, the feature mapper 144 may analyze each developed product feature 212 and utilized product feature 208, 216 for a corresponding tested product feature 204, 220. In the preceding analysis, where the feature mapper 144 detects a corresponding product feature, the feature mapper 144 may generate a mapping between the tested product feature 204, 220 and the corresponding utilized product feature 208, 216 or develop product feature 212. In certain implementations, the feature mapper 144 may count the number of corresponding product features and may generate a stronger mapping for larger numbers of corresponding product features, or may only generate a mapping if the number of corresponding product features exceed a threshold.

The business intelligence integrator may then determine insufficient mapping (block 312). For example, the job flag identifier 148 of the business intelligence integrator 134 may identify an insufficient mapping 158 based on the feature map 146, 200. An insufficient mapping 158 may be determined as any developed product feature 212 or utilized product feature 208, 216 that lacks a tested product feature 204, 220, or vice versa. An insufficient mapping 158 may also be determined as a mapping that is not strong enough given the number of product features in the database. For example, a given feature of the software product may have multiple utilized product features 208, 216 within the unified business intelligence data 138, signifying large user interest in the product feature. However, the utilized product features 208, 216 may not have sufficient corresponding tested product features 204, 220 within the unified job data 142. In such implementations, although there may be a mapping corresponding to the utilized product features 208, 216, that mapping may be determined to be too weak based on the number of corresponding utilized product features 208, 216 (e.g., based on a threshold calculated based on the number of corresponding utilized product features 208, 216). Similarly, an insufficient mapping 150 may be determined where the mapping is too strong between a tested product feature 204, 220 and utilized product features 208, 216. For example, there may be multiple, similar jobs 106, 108 testing a tested product feature 204, 220 that has a corresponding utilized product feature 208, 216 with minimal entries within the unified business intelligence data 138. Because of the relative lack of importance of the corresponding utilized product feature 208, 216, the mapping between the tested product feature 204, 220 and the utilized product feature 208, 216 may be determined to be too strong (e.g., in excess of a threshold calculated based on the number of corresponding utilized product features 208, 216).

The business intelligence integrator may then identify a job flag (block 314). For example, job flag identifier 148 of the business intelligence integrator 134 may identify one or more job flags 150, 152 based on the insufficient mapping 158. As explained above, the insufficient mapping 150 may relate to one or more issues with a job 106, 108, 202, 218.

For example, job flag 150, 152 may be generated to identify one or more of an unnecessary job, a stale job, wasteful job, or a missing job.

The job flag 150, 152 may then be used for further processing. For example, the job flag identifier 148 and/or the business intelligence integrator 134 may generate a recommendation and presented to the user (e.g., present a user alert or email the recommendation to the user). The recommendation may suggest removal for unnecessary jobs or stale jobs. As another example, the recommendation may suggest adjusting the execution frequency for wasteful jobs (e.g., reducing the execution frequency). Further, the recommendation may suggest creating a new job 106, 108, 202, 218 for missing jobs (e.g., recommend creating a job to test the utilized or developed product feature). For example, if the business intelligence data 122, 124, 126, 128, 206, 214 indicates that a lot of users are using 6 node deployments of a software product, but there are no corresponding tested product features 204, 220 testing 6 node deployments, the job flag identifier may identify a job flag 150, 152 indicating a missing job and the recommendation may suggest creating a new job 106, 108, 202, 218 to test the software product using 6 nodes. As another example, if the business intelligence data 122, 124, 126, 128, 206, 214 indicates that there are no users using a software product with more than 10 nodes, but there is a tested product feature 204, 220 testing the software product with 11 nodes, the job flag identifier may identify the corresponding job as an unnecessary job and the recommendation may suggest removing the unnecessary job from the continuous integration environment 102.

After receiving the recommendation, a user may be able to select an option to implement the recommendation (e.g., by creating and removing jobs 106, 108, 202, 218 within the continuous integration environment 102). In certain implementations, the recommendation may also include a hold button that allows the user to delay acting on the recommendation for certain period of time and to be reminded again of the recommendation in the future. In certain implementations, the business intelligence integrator 134 may automatically enact the recommendation, e.g., by automatically removing jobs 106, 108, 202, 218 from the continuous integration environment 102 or automatically adjusting the execution frequency of wasteful jobs.

All or some of the blocks of the method 300 may be optional. Similarly, although depicted as occurring in sequence, one or more of the blocks may be performed in parallel. For example, blocks 302 and 304 may be performed in parallel (e.g., on multiple threads of a multi-threaded CPU 114, 130, 154).

Figure 4A:
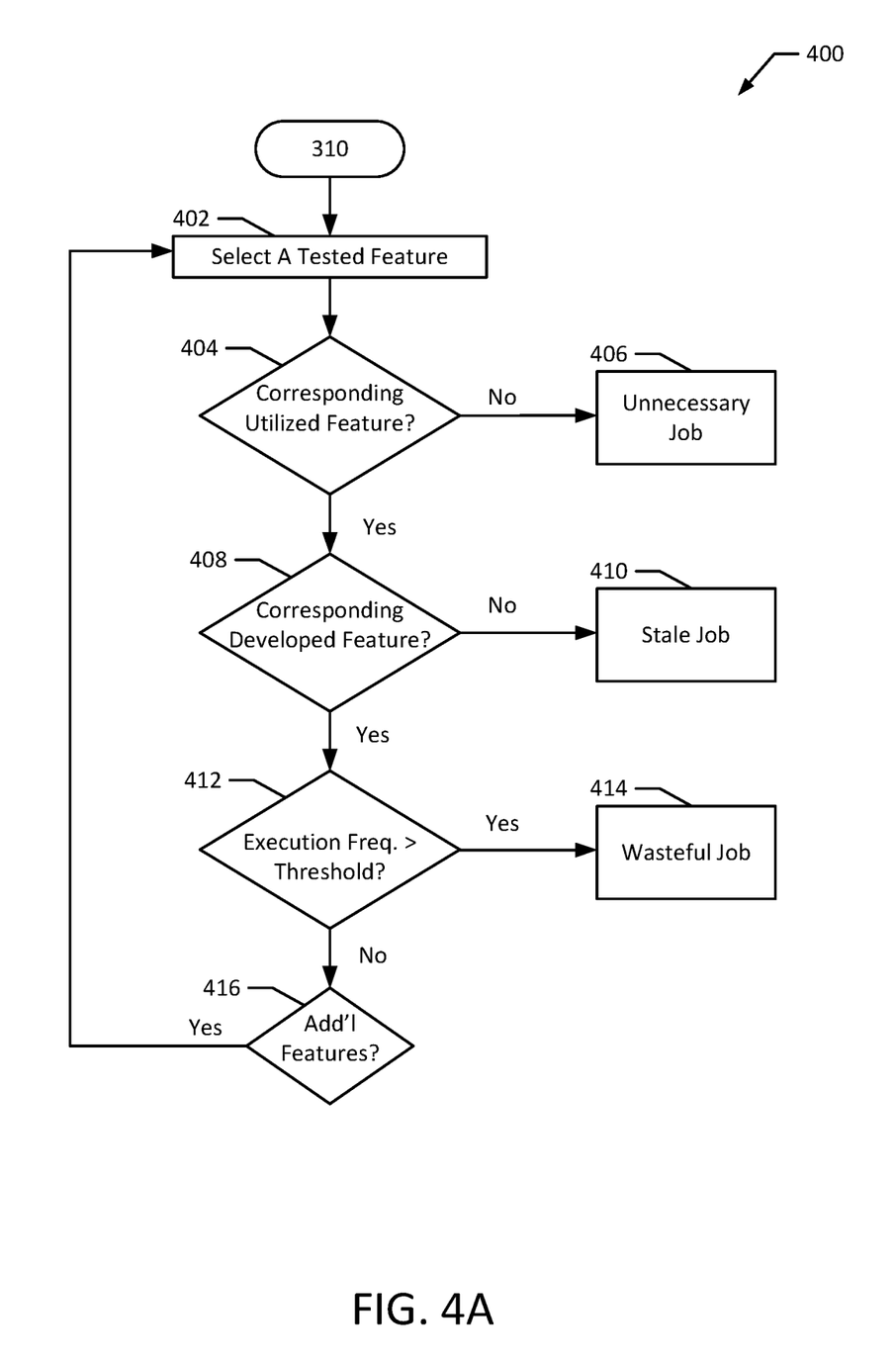
FIGS. 4A-B illustrate methods according to exemplary embodiments of the present disclosure.

FIG. 4A depicts a method 400 according to an exemplary embodiment of the present disclosure. The method 400 may be performed to determine insufficient mapping 158 and/or to identify a job play 150, 152 within a feature map 146, 200. For example, the method 400 may be performed of blocks 312, 314 of the method 300. For example, method 400 may be performed after generating the feature map 146, 200 at block 310.

The method 400 may be implemented on a computer system, such as the system 100. For example, method 400 may be implemented by the continuous integration environment 102, the business intelligence system 118, and/or the business intelligence integrator 134. The method 400 may also be implemented by a set of instructions stored on a computer readable medium that, when executed by a processor, cause the computer system to perform the method. For example, all or part of the method 400 may be implemented by the CPUs 114, 130, 154 and the memories 116, 132, 156. Although the examples below are described with reference to the flowchart illustrated in FIG. 4A, many other methods of performing the acts associated with FIG. 4A may be used. For example, the order of some of the blocks may be changed, certain blocks may be combined with other blocks, one or more of the blocks may be repeated, and some of the blocks described may be optional.

The method 400 may begin by selecting a tested product feature for analysis (block 402). For example, the job flag identifier 148 may select a tested product feature 204, 220 from the feature map 146, 200 for analysis. The job flag identifier 148 may select a first tested product feature 204, 220 of the feature map 146, 200 for analysis at an initial iteration of the method 400, or may select a subsequent tested product feature 204, 220 for analysis if the method 400 is being repeated, as explained below.

The job flag identifier may then determine whether there is a corresponding utilized product feature for the selected tested product feature (block 404). For example, the job flag identifier 148 may determine whether there is a corresponding utilized product feature 208, 216 for the selected tested product feature 204, 220. In making this determination, the job flag identifier 148 may determine whether there is a mapping in the feature map 146, 200 between the selected tested product feature 204, 220 and a utilized product feature 208, 216. If there is no corresponding utilized product feature, the job flag identifier may identify the selected tested product feature as corresponding to an unnecessary job (block 406). For example, if there is no corresponding utilized product feature 208, 216, the job flag identifier 148 may identify a job flag 150, 152 for the job 106, 108 associated with the selected tested product feature 204, 220 indicating that the associated job 106, 108 is an unnecessary job. If there is a corresponding utilized product feature 208, 216, processing may continue.

The job flag identifier may then determine whether there is a corresponding developed product feature for the selected tested product feature (block 408). For example, the job flag identifier 148 may determine whether there is a corresponding developed product feature 212 for the selected tested product feature 204, 220. In making this determination, the job flag identifier 148 may determine whether there is a mapping in the feature map 146, 200 between the selected tested product feature 204, 220 and a developed product feature 212. For example, the job flag identifier 148 may determine whether there is code submission data 126, 210 identifying a sufficient number of recent code check-ins or recent developer activity, where recent is identified as a certain time period (e.g., the preceding 30 days, 3 months, one year). As another example, the job flag identifier 148 may determine whether the mapping indicates a sufficient number of developers associated with recent code check-ins, which may be indicative of a level of importance of the underlying product feature. If there is no corresponding developed product feature 212, the job flag identifier 148 may identify the selected tested product feature as corresponding to a stale job (block 410). For example, if there is no corresponding developed product feature 212, the job flag identifier 148 may identify a job flag 150, 152 for the job 106, 108, 202, 218 associated with the selected tested product feature 204, 220 indicating that the job 106, 108, 202, 218 is a stale job. If there is a corresponding developed product feature 212, processing may continue.

The job flag identifier may then determine whether an execution frequency of a job corresponding to be selected tested product feature exceeds a threshold (block 412). For example, the job flag identifier 148 may determine whether an execution frequency of a job 106, 108, 202, 218 corresponding to the selected tested product feature 204, 220 exceeds a maximum threshold. The maximum threshold may be set based on, e.g., a priority of the selected test product feature 204, 220, a utilization measure such as a count of the number of corresponding sales orders, customer support tickets, price, and development efforts associated with the selected tested product feature 204, 220. For example, the selected tested product feature 204, 220 may correspond to a developed product feature 212 associated with code submission data 126. The maximum threshold may be determined based on a number of code check-ins or associated developers indicated by the code submission data 126. If the number of either the code check-ins or the associated developers is high, the selected tested product feature 204, 220 may be considered high priority and the maximum threshold may be set higher to allow for more frequent testing of the selected testing product feature 204, 220 (e.g., product features that are currently in active development). Conversely, if the number of both is low, the maximum threshold may be set lower to restrict the execution frequency of product features that are not currently in development in order to leave more computing resources for quickly testing actively-developed features. If the execution frequency is greater than the maximum threshold, the job flag identifier 148 may identify the selected tested product feature is corresponding to a wasteful job (block 414). For example, if the execution frequency is greater than the maximum threshold, the job flag identifier 148 may identify a job flag 150, 152 for the job 106, 108, 202, 218 associated with the selected tested product feature 204, 220 indicating that the job 106, 108, 202, 218 is a wasteful job. If the execution frequency does not exceed the maximum threshold, processing may continue.

In certain implementations, a minimum threshold may be also or alternatively set indicating a desired minimum execution frequency for jobs associated with popular product features. For example, popular product features may be identified based on high utilization as indicated in business intelligence data 122, 124, 126, 128, 206, 214. The job flag identifier 148 may compare the execution frequency of a job 106, 108, 202, 218 associated with the selected tested product feature 204, 220 to ensure that the execution frequency is greater than the minimum threshold. If not, the job flag identifier 148 may identify a job flag 150, 152 indicating that the corresponding job 106, 108, 202, 218 is not being executed frequently enough. Checking against this minimum threshold may help ensure that popular product features are tested sufficiently to protect against unnecessary bugs and/or deployment issues during future development.

The job flag identifier may then determine whether there are additional tested product features within the feature map (block 416). For example, the job flag identifier 148 may identify whether there are additional tested product features 204, 220 within the feature map 146, 200 for analysis. The method 400 may be repeated once for every tested product feature 204, 220 within the feature map 146, 200.

All or some of the blocks of the method 400 may be optional. Similarly, although depicted as occurring in sequence, one or more of the blocks may be performed in parallel. For example, one or more of blocks 404, 408, 412 may be performed in parallel. Also, the order of the blocks may be changed. For example, the job flag identifier 148 may be configured to check for corresponding developed features 212 (block 408) before checking for corresponding utilized features 208, 216 (block 404). Additionally, after each of blocks 406, 410, 414, processing may continue with a subsequent decision block 404, 408, 412. For example, after determining that a job 106, 108, 202, 218 is an unnecessary job (block 406), the job flag identifier 148 may continue with determining whether the selected tested product feature 204, 220 has any corresponding developed product feature 212 (block 408). In this way, a single job 106, 108, 202, 218 may, e.g., be identified as both an unnecessary job and a stale job. Jobs that are identified by more than one job flag 150, 152 may be more likely to be deleted or recommended for deletion by the business intelligence integrator 134.

Figure 4B:
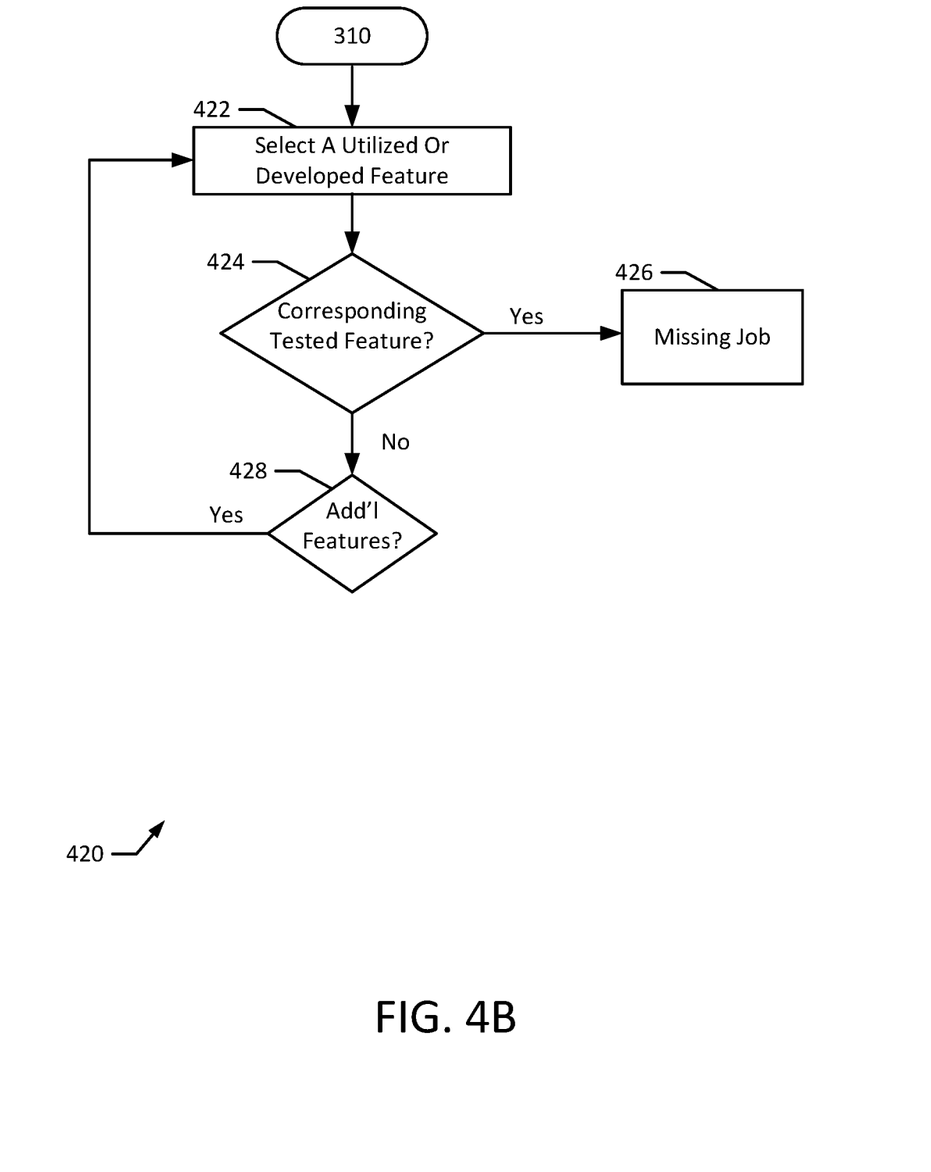

FIG. 420 depicts a method 420 according to an exemplary embodiment of the present disclosure. The method 420 may be performed to analyze utilized product features of the feature map 146, 200 to identify job planks 150, 152. The method 420 may be performed by the job flag identifier 148 at blocks 312, 314 of the method 300. For example, the method 420 may be performed after generating the feature map 146, 200.

The method 420 may be implemented on a computer system, such as the system 100. For example, method 420 may be implemented by the continuous integration environment 102, the business intelligence system 118, and/or the business intelligence integrator 134. The method 420 may also be implemented by a set of instructions stored on a computer readable medium that, when executed by a processor, cause the computer system to perform the method. For example, all or part of the method 420 may be implemented by the CPUs 114, 130, 154 and the memories 116, 132, 156. Although the examples below are described with reference to the flowchart illustrated in FIG. 4B, many other methods of performing the acts associated with FIG. 4B may be used. For example, the order of some of the blocks may be changed, certain blocks may be combined with other blocks, one or more of the blocks may be repeated, and some of the blocks described may be optional.

The method 420 may begin with the job flag identifier selecting a utilized product feature or developed product feature for analysis (block 422). For example, the job flag identifier 148 may select a utilized product feature 208, 216 or developed product feature 212 from the feature map 146, 200 for analysis. The job flag identifier 148 may select a first utilized product feature 208, 216 or developed product feature 212 of the feature map 146, 200 for analysis at an initial iteration of the method 420, or may select a subsequent utilized product feature 208, 216 or developed product feature 212 for analysis if the method 420 is being repeated, as explained below.

The job flag identifier may then determine whether there is a corresponding tested product feature for the selected utilized product feature or developed product feature (block 404). The job flag identifier 148 may determine whether there is a corresponding tested product feature 204, 220 for the selected utilized product feature 208, 216 or developed product feature 212. In making this determination, the job flag identifier 148 may determine whether there is a mapping in the feature map 146, 200 between the selected utilized product feature 208, 216 or developed product feature 212 and a tested product feature 204, 220. If there is no corresponding tested product feature, the job flag identifier may identify the selected utilized product feature or developed product features corresponding to a missing job (block 426). For example, if there is no corresponding tested product feature 204, 220, the job flag identifier 140 may identify a job flag 150, 152 indicating that there is a missing job that should be associated with the selected utilized product feature 208, 216 or developed product feature 212. If there is a corresponding tested product feature 204, 220, processing may continue.

The job flag identifier may then determine whether there are additional utilized product features or developed product features within the feature map (block 428). For example, the job flag identifier 148 may identify whether there are additional utilized product features 208, 216 or developed product features 212 for analysis. The method 420 may be repeated once for every utilized product feature 208, 216 or developed product feature 212 within the feature map 146, 200.

The methods 400, 420 may be performed separately or in combination. For example, the method 400 may be performed in conjunction with the method 420 in order to implement blocks 312, 314 of the method 300. In such implementations, the method 400 may be performed before, after, or in parallel with the method 420.

Additionally, in both or either of the methods 400, 420, when determining whether there is a corresponding product feature (e.g., a corresponding utilized product feature 208, 216 or a corresponding tested product feature 214, 220), the job flag identifier 148 may also be configured to analyze the strength of a mapping. For example, although a mapping may exist between, e.g., a tested product feature 204, 220 and a utilized product feature 208, 216, the job flag identifier 148 may, in certain instances, determine that there is no corresponding utilized product feature 208, 216 for the selected tested product feature 204, 220 if the mapping between the two is not strong enough. For example, although mapping may exist, the job flag identifier 148 may determine that there is no corresponding utilized product feature 208, 216 if the mapping between the utilized product feature 208, 216 and a selected tested product feature 204, 220 does not exceed a threshold. The threshold may be set based on, e.g., an importance of the selected product feature, resources used by a job 106, 108, 202, 218 corresponding to the selected product feature, or another priority measure of the selected product feature. The threshold determination may vary across, e.g., software products and may depend on user input.

Figure 5:
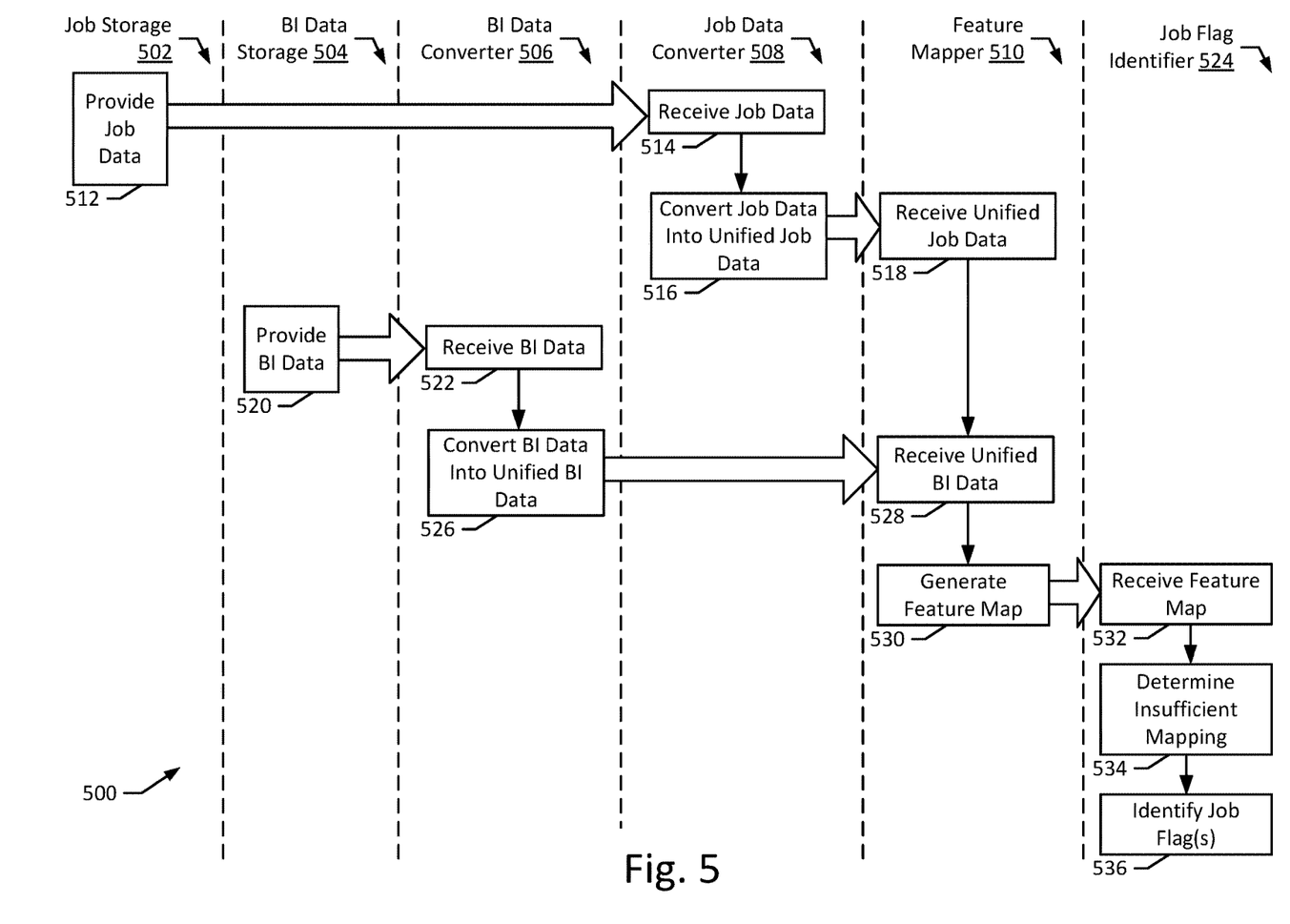
FIG. 5 illustrates a method according to an exemplary embodiment of the present disclosure.

FIG. 5 depicts a method 500 according to an exemplary embodiment of the present disclosure. The method 500, when executed, may collect and analyze job data and business intelligence data 122, 124, 126, 128, 206, 214 to identify one or more job flags 150, 152.

The method 500 may be implemented on a computer system, such as the system 100. For example, method 500 may be implemented by the continuous integration environment 102, the business intelligence system 118, and/or the business intelligence integrator 134. The method 500 may also be implemented by a set of instructions stored on a computer readable medium that, when executed by a processor, cause the computer system to perform the method. For example, all or part of the method 500 may be implemented by the CPUs 114, 130, 154 and the memories 116, 132, 156. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 includes a job storage 502, a business intelligence data storage 504, a business intelligence data converter 506, a job data converter 508, a feature mapper 510, and a job flag identifier 524. The method 500 may be performed by the system 100. For example, the job storage 502 may be an example implementation of the job storage 104, the business intelligence data storage 504 may be an example implementation of the business intelligence data storage 120, the business intelligence data converter 506 may be an example implementation of the business intelligence data converter 136, the job data converter 508 may be an example implementation of the job data converter 140, the feature mapper 510 may be an example implementation of the feature mapper 144, and the job flag identifier 524 may be an example implementation of the job flag identifier 148.

The method 500 may begin with the job storage 502 providing job data to the job data converter 508 (block 512). Job data may include information, such as job names and job parameters regarding jobs 106, 108, 202, 218 stored in the job storage 502. The job data converter 508 may receive the job data (block 514). As explained above, the job data provided by the job storage 502 may come in a first format. In addition, job storage 502 may store the job data in a plurality of formats. The job data converter 508 may therefore convert the job data from the first format into unified job data in a unified format (block 516). For example, as expended above, the job data converter 508 may identify one or more tested product features 204, 220 associated with jobs 106, 108, 202, 218 stored within the job storage 502. The job data converter 508 may analyze the job data using one or more heuristics and/or the machine learning models to identify the tested product features 204, 220. The feature mapper 510 may then receive the unified job data 142 from the job data converter 508 (block 518).

The business intelligence data storage 504 may then provide business intelligence data 122, 124, 126, 128, 206, 214 to the business intelligence data converter 506 (block 520). The business intelligence data 206, 214 may include one or more of customer support data 122, CRM data 124, code submission data 126, and sales order data 128. Depending on the implementation, the business intelligence data 122, 124, 126, 128, 206, 214 may arrive in a plurality of formats. Therefore, after receiving the business intelligence data 122, 124, 126, 128, 206, 214 (block 522), the business intelligence data converter 506 may convert the business intelligence data 122, 124, 126, 128, 206, 214 into unified business intelligence data 138 in the unified format (block 526). In converting the business intelligence data 122, 124, 126, 128, 206, 214, the business intelligence data converter 506 may use one or more heuristics or machine learning models. As expended above, the heuristics may rely on input provided by users, such as business intelligence system 118 administrators. The feature mapper may then receive the unified business intelligence data 138 (block 528).

In certain implementations, the blocks 512-518 may be performed after blocks 520-528 as depicted in FIG. 5. In other examples, blocks 512-518 and 520-528 may be performed in parallel.

After receiving the unified job data 142 in the unified business intelligence data 138, the feature mapper 510 and then generate a feature map 146, 200 (block 530). The feature map 146, 200 may identify one or more mappings between tested product features 204, 220 and utilize product features 208, 216 or developed product features 212. In generating the feature map 146, 200, the feature mapper 510 may analyze each of the tested product features 204, 220 for corresponding utilize product features 208, 216 or corresponding developed product features 212. Similarly, the feature mapper 510 may analyze each of the utilize product features 208, 216 in the developed product features 2124 corresponding tested product features 204, 220.

The job flag identifier 524 may then receive the feature map 146, 200 from the feature mapper 510 (block 532). The job flag identifier 524 may analyze the feature map 146, 200 to determine one or more insufficient mappings 158 (block 534). For example, as explained above, the job flag identifier may identify insufficient mappings 158 where the feature map 146, 200 lacks a mapping between tested product features 204, 220 and a utilized product features 208, 216 or developed product features 212. Similarly, the job flag identifier 524 may identify insufficient mappings 158 where a mapping between the tested product feature and a utilized product feature 208, 216 or developed product feature 212 is not strong enough. Based on the determined one or more insufficient mappings 158, the job flag identifier 524 may identify one or more job flags 150, 152 (block 536). For example, as explained above, the job flag identifier 524 may identify job flags for wasteful jobs, unnecessary jobs, steel jobs, or missing jobs. The job flags 150, 152 may be subsequently used to generate recommendations or to automatically manipulate, delete, or adjust jobs 106, 108, 202, 218 within the job storage 502.

Figure 6:
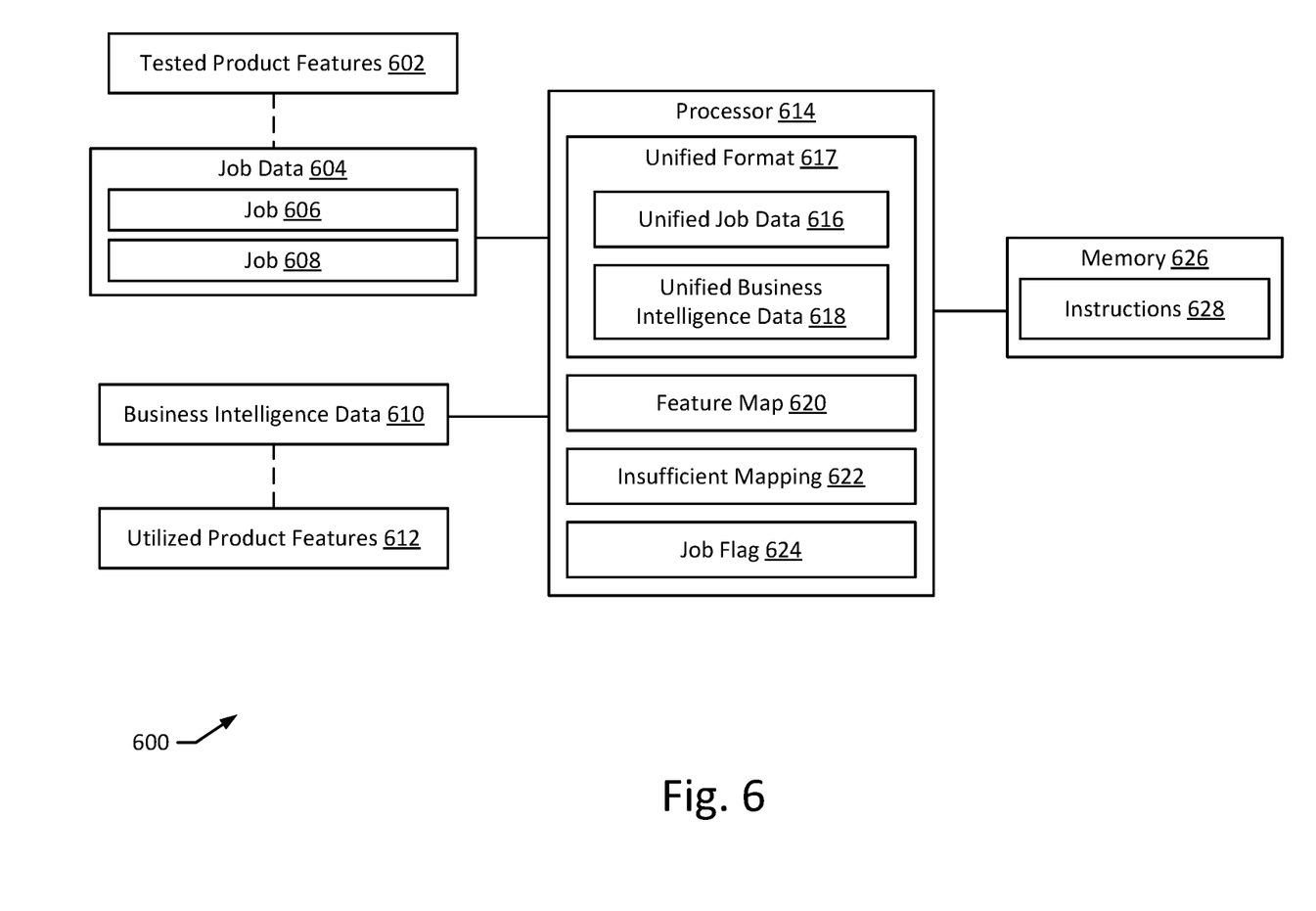
FIG. 6 illustrates a system according to an exemplary embodiment of the present disclosure.

FIG. 6 depicts a system 600 according to an exemplary embodiment of the present disclosure. The system 600 includes a processor 614 and a memory 626. The memory 626 contains instructions which, when executed by the processor 614, cause the processor to receive business intelligence data 610 comprising data regarding a plurality of utilized product features 612 and receive job data 604 comprising one or more jobs 606, 608, where each job 606, 608 relates to at least one of a plurality of tested product features 602. The memory 626 also contains instructions which, when executed by the processor 614, cause the processor 614 to convert the business intelligence data 610 into unified business intelligence data 618 in a unified format 617, convert the job data 604 into unified job data 616 in the unified format 617, and generate a feature map 620 between the utilized product features 612 and the tested product features 602 based on the unified business intelligence data 618 and the unified job data 616. The memory 626 also contains instructions which, when executed by the processor 614, cause the processor 614 to determine an insufficient mapping 622 of the feature map 620 between a tested product feature 602 and at least one of the plurality of utilized product features 612 and identify at least one job flag 624 based on the insufficient mapping 622.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving business intelligence data comprising data regarding a plurality of utilized product features;
receiving job data comprising one or more jobs, wherein each job executes within a continuous integration environment and relates to at least one of a plurality of tested product features;
converting the business intelligence data into unified business intelligence data in a unified format;
converting the job data into unified job data in the unified format;
generating a feature map between the utilized product features and the tested product features based on the unified business intelligence data and the unified job data;
determining an insufficient mapping of the feature map between a tested product feature and at least one of the plurality of utilized product features; and
identifying, based on the insufficient mapping, a first job flag for a first job that corresponds to a tested product feature with no corresponding utilized product feature in the feature map; and
based on the first job flag, at least one of: (i) removing the first job from the continuous integration environment to prevent future executions of the first job and (ii) adjusting an execution frequency for the first job within the continuous integration environment.

2. The method of claim 1, wherein the business intelligence data further comprises data regarding a plurality of developed product features and the method further comprises identifying a second job flag for a stale job related to a tested product feature with no corresponding developed product feature in the feature map.

3. The method of claim 1, further comprising identifying a third job flag for a wasteful job configured to execute at a frequency that exceeds a threshold set based on a number of utilized product features in the feature map corresponding to the tested product feature.

4. The method of claim 1, further comprising identifying a fourth job flag for a missing job corresponding to a utilized product feature with no corresponding tested product feature in the feature map.

5. The method of claim 1, further comprising:
removing the first job flag from a continuous integration environment corresponding to the job data.

6. The method of claim 1, further comprising:
generating a job recommendation based on the first job flag.

7. The method of claim 6, wherein the job recommendation includes one or more recommendations selected from the group consisting of: (i) removing the first job associated with the first job flag, (ii) adjusting an execution frequency of the first job, and (iii) creating a new job to test a utilized product feature.

8. The method of claim 1, wherein converting the job data into the unified job data comprises:
analyzing one or both of (i) a job name of a job and (ii) a job parameter of a job to identify a tested product feature.

9. The method of claim 1, wherein the business intelligence data comprises one or more of the data types consisting of: customer support data, customer relationship management (CRM) data, code submission data, and customer sales orders.

10. The method of claim 9, wherein the business intelligence data comprises a plurality of data types, and wherein converting the business intelligence data into the unified business intelligence data comprises:
   converting data of each of the plurality of data types into converted data in the unified format; and
   removing duplicate entries within the converted data.

11. The method of claim 1, wherein the business intelligence data represents one or both of developer behavior regarding the product feature and customer behavior regarding the product feature.

12. A system comprising:
   a processor; and
   a memory containing instructions which, when executed by the processor, cause the processor to:
      receive business intelligence data comprising data regarding a plurality of utilized product features;
      receive job data comprising one or more jobs, wherein each job executes within a continuous integration environment and relates to at least one of a plurality of tested product features;
      convert the business intelligence data into unified business intelligence data in a unified format;
      convert the job data into unified job data in the unified format;
      generate a feature map between the utilized product features and the tested product features based on the unified business intelligence data and the unified job data;
      determine an insufficient mapping of the feature map between a tested product feature and at least one of the plurality of utilized product features;
      identify, based on the insufficient mapping, a first job flag for a first job that corresponds to a tested product feature with no corresponding utilized product feature in the feature map; and
      based on the first job flag, at least one of: (i) remove the first job from the continuous integration environment to prevent future executions of the first job and (ii) adjust an execution frequency for the first job within the continuous integration environment.

13. The system of claim 12, wherein the business intelligence data further comprises data regarding a plurality of developed product features and the instructions further cause the processor to identify a second job flag for a stale job related to a tested product feature with no corresponding developed product feature in the feature map.

14. The system of claim 12, wherein the instructions further cause the process to identify a third job flag for a wasteful job configured to execute at a frequency that exceeds a threshold set based on a number of utilized product features in the feature map corresponding to the tested product feature.

15. The system of claim 12, wherein the instructions further cause the processor to identify a fourth job flag for a missing job corresponding to a utilized product feature with no corresponding tested product feature in the feature map.

16. The system of claim 12, wherein the memory contains further instructions which, when executed by the processor, cause the processor to:
   remove the first job flag from a continuous integration environment corresponding to the job data.

17. The system of claim 12, wherein the memory contains further instructions which, when executed by the processor, cause the processor to:
   generate a job recommendation based on the first job flag.

18. A non-transitory, computer-readable medium storing instructions which, when executed by a processor, cause the processor to:
   receive business intelligence data comprising data regarding a plurality of utilized product features;
   receive job data comprising one or more jobs, wherein each job executes within a continuous integration environment and relates to at least one of a plurality of tested product features;
   convert the business intelligence data into unified business intelligence data in a unified format;
   convert the job data into unified job data in the unified format;
   generate a feature map between the utilized product features and the tested product features based on the unified business intelligence data and the unified job data;
   determine an insufficient mapping of the feature map between a tested product feature and at least one of the plurality of utilized product features;
   identify, based on the insufficient mapping, a first job flag for a first job that corresponds to a tested product feature with no corresponding utilized product feature in the feature map; and
   based on the first job flag, at least one of: (i) remove the first job from the continuous integration environment to prevent future executions of the first job and (ii) adjust an execution frequency for the first job within the continuous integration environment.

* * * * *